United States Patent [19]

Spratte et al.

[11] Patent Number: 5,175,425
[45] Date of Patent: Dec. 29, 1992

[54] PROCESS FOR MARKING SEMICONDUCTOR SURFACES

[75] Inventors: Hans-Hermann Spratte, Kirchheim-Teck; Werner Reindl, Unterhaching, both of Fed. Rep. of Germany

[73] Assignee: Leuze Electronic GmbH & Co., Owen-Teck, Fed. Rep. of Germany

[21] Appl. No.: 744,669

[22] PCT Filed: Jun. 15, 1987

[86] PCT No.: PCT/DE88/00357
§ 371 Date: Feb. 15, 1989
§ 102(e) Date: Feb. 15, 1989

[87] PCT Pub. No.: WO88/10475
PCT Pub. Date: Dec. 29, 1988

Related U.S. Application Data

[63] Continuation of Ser. No. 327,962, Feb. 15, 1989, abandoned.

[30] Foreign Application Priority Data

Jun. 15, 1987 [DE] Fed. Rep. of Germany ....... 3719983

[51] Int. Cl.$^5$ ............................................. G06K 19/06
[52] U.S. Cl. .................................... 235/494; 235/462; 235/463; 235/464; 346/76 L
[58] Field of Search ............... 235/462, 463, 464, 494; 346/76 L; 369/109

[56] References Cited

U.S. PATENT DOCUMENTS

| | | | |
|---|---|---|---|
| 4,652,722 | 3/1987 | Stone et al. | 235/487 O X |
| 4,680,459 | 7/1987 | Drexler | 346/76 L |
| 4,810,867 | 3/1989 | Speicher | 235/494 |

Primary Examiner—Harold Pitts
Attorney, Agent, or Firm—Michael J. Striker

[57] ABSTRACT

The bar code (Sk) for marking semiconductor surfaces includes a plurality of parallel bar elements (Se) having identical widths (b), wherein every bar element (Se) is formed as a series of overlapping softmark melting points (SSp) produced by means of laser bombardment to a depth of less than 2 u m. Narrow bars (sSt) are preferably formed by means of one bar element (Se) and wide bars (bSt) are preferably formed by means of two bar elements (Se) which are applied at a slight distance (a) relative to one another. The process for marking semiconductor surfaces with this bar code includes producing by laser bombardment with a softmark technique a plurality of parallel bar elements (Se). Each bar element is formed by a series of overlapping softmark melting points (SSp). The melting points (SSp) of the bar elements (Se) are applied at a depth of less than 2 micrometers, and the laser bombardment is controlled with respect to time so that, when producing one of the softmark melting points (SSp), the previously produced softmark melting point is at least partially hardened again.

7 Claims, 2 Drawing Sheets

PROCESS FOR MARKING SEMICONDUCTOR SURFACES

This application is a continuation of application Ser. No. 327,962, filed Feb. 15, 1989 now abandoned.

BACKGROUND OF THE INVENTION

The invention concerns a process for marking semiconductor surfaces with a bar code produced by means of laser bombardment.

In such a process, known from the U.S. Pat. No. 4,585,931, a bar code whose individual bars have a depth of approximately 8 to 10 μm is produced on the surface of a wafer by means of laser bombardment. The bar code, also known as barcode, is a combination of narrow bars, narrow gaps, wide bars and wide gaps.

In a process for marking semiconductor surfaces, known from the EP-A-O 134 469, alphabetic characters, numeric characters and other symbols are formed by means of circular melting points which are arranged at a distance relative to one another and are produced in the laser bombardment by means of melting on and partial evaporation of the semiconductor material. The circular melting points have depths of between 1 and 5 μm and diameters between 70 and 75 μm.

The mechanical reading of OCR characters (OCR-=Optical Character Recognition) requires expensive devices in comparison with a bar code. Moreover, the ratio of defective decoding results to correct decoding results in a bar code is substantially smaller than in clear characters. For example, the typical substitution error rate in the known bar code "Code 39" is $1:3 \times 10^6$, whereas, in clear, it is $1:10^4$. Finally, the space requirement for clear is relatively large with respect to character height and character density. The clear produced by means of laser according to the process known e.g. from the EP-A-O 134 469 can be produced in so-called softmark marking. Such softmark marking is understood to mean a melting on or melting around the surface of the semiconductor wafer at a small depth of approximately 1 μm, in which material spatters are not produced and crystal defects do not occur in the immediate vicinity of the marking. The softmark marking of semiconductor wafers is particularly advantageous because this marking method can be applied at any desired point in time during the course of the chip production.

The laser marking of semiconductor surfaces with bar codes with the softmark technique could be controlled according to the prior art, but not its mechanical readability with commercially available bar code reading devices. The reason for this is that the reading signals in the detection of bar code symbols cannot be distinguished with the required reliability. The surface reflection and scattered light portion of wide and narrow bars are not reproducible in bar codes with the softmark technique. A reading reliability suited to the requirements of bar code, e.g. 0.003 per thousand in the known "Code 39", is not ensured in laser writing with the softmark technique.

In contrast, the hardmark marking of semiconductor surfaces with bar codes, known e.g. from the U.S. Pat. No. 4,585,931, can be decoded with optical sensing devices. In this case, the laser bombardment produces a depth marking with wide grooves for the individual bars. However, marking semiconductor surfaces by means of laser bombardment with the hardmark technique can only be applied by the wafer manufacturer because of possible shifting of the crystal and/or impurities in the surface of the semiconductor wafers. That is, the wafer producer still has the possibility of eliminating the defects by means of mechanical or chemical subsequent treatment after the application of the bar code. But this is not possible for the chip producer. Moreover, the necessary space requirement is relatively large with respect to character height and character density in marking by means of hardmark marking.

SUMMARY OF THE INVENTION

The object of the invention is to provide a process for marking semiconductor surfaces with a bar code produced by means of laser bombardment with the softmark technique, which bar code allows a high character density with very small character height on the one hand and enables a reliable reading and decoding of the bar code at low cost on the other hand.

The object is met, in a process according to the generic type, producing the bar code in the form of bar elements having identical widths, and each bar element being formed by a series of overlapping melting points produced by the softmark technique.

The bar elements in the present method are applied at a depth of less than 2 micrometers.

The invention is based on the understanding that caterpillar-like and scattered-light intensive bar elements can be formed by means of a series of overlapping softmark melting points, and that bar codes with narrow bars, narrow gaps, wide bars and wide gaps and without crystal defects can be produced from such bar elements of the same width. The wide bars are preferably formed by means of m parallel bar elements and the narrow bars are preferably formed by means of n parallel bar elements, wherein m and n are whole numbers and m>n. A particularly simple application of the bar codes and an extremely high character density are achieved in particular when wide bars of the bar code are formed by means of two parallel bar elements and narrow bars are formed by means of one bar element. If the bar elements of the wide bars are applied at a slight distance relative to one another, a particularly reliable detection of the two bars is effected by means of measuring the extremely narrow distance and by means of counting the bar elements belonging to this bar.

It has proven particularly advantageous with respect to a character density which is as high as possible and a reliable detection of the bar code, which is applied without crystal defects, that the bar elements of the wide bars be applied at a distance of less than 15 μm relative to one another, with a width of less than 15 μm, and with a depth of less than 2 μm.

In addition, it has proven particularly favorable with respect to the quality of markings which are free of crystal defects that the softmark melting points be produced with a pulsed nd-yag laser, particularly an output-stabilized frequency-doubled nd-yag laser.

Finally, the best results are obtained with respect to unwanted shifting in the crystal lattice when the laser bombardment is controlled with respect to time in such a way that the previously applied softmark melting point is hardened again at least partially when applying a softmark melting point and its contour is retained.

An embodiment example of the invention is shown in the drawing and described in more detail in the following.

DESCRIPTION OF THE PREFERRED EMBODIMENTS

Figure 1:
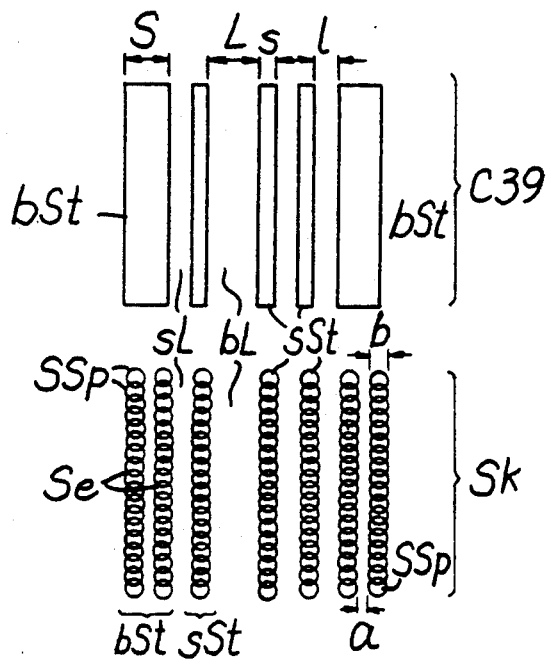
FIG. 1 shows a basic comparison between the known "Code 39" and a bar code produced according to the process of the invention.

A section of a conventional bar code according to the "Code 39" designated by C 39 is shown in the upper portion of FIG. 1. As seen from left to right, the section comprises a wide bar bSt of width S, a narrow gap sL of width 1, a narrow bar sSt of width s, a wide gap bL of width L, a narrow bar sSt, a narrow gap sL, a narrow bar sSt, a narrow gap sL and a wide bar bSt. This bar code C 39 configuration corresponds to the number 1.

A corresponding bar code SK configuration, which can be applied to the polished surface of a semiconductor wafer of silicon, germanium or the like by means of laser bombardment is shown in the bottom part of FIG. 1. It can be seen that the entire bar code Sk is formed by means of individual softmark melting points SSp, wherein a series of overlapping softmark melting points SSp forms a bar element Se of width b. In the shown embodiment example, one of these bar elements Se forms a narrow bar sSt, while two bar elements Se, which are applied at a distance a relative to one another, form a wide bar bSt. The distance a is clearly smaller than the width 1 of a narrow gap sL.

In the schematic view of the number 1 in FIG. 1, every softmark melting point SSp is shown by means of a complete circular contour. Actually, however, only the softmark melting points SSp of a bar element Se which were applied last have such a complete circular contour, whereas all other softmark melting points SSp have a sickle-shaped contour.

Figure 2:
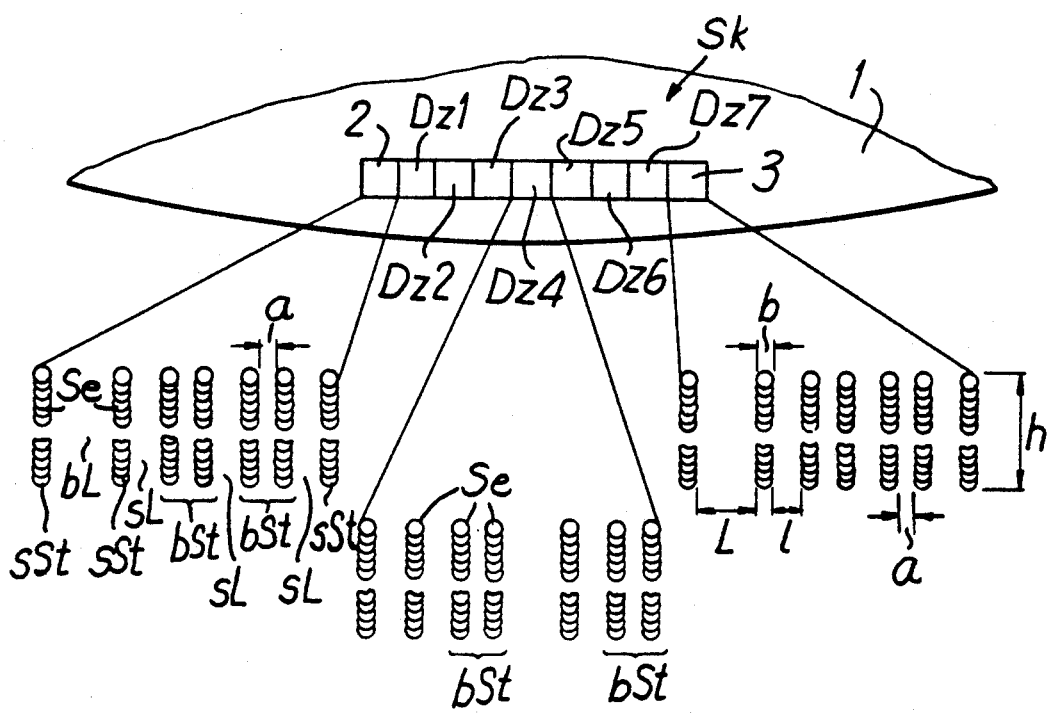
FIG. 2 shows a schematic view of a bar code applied to the polished side of a semiconductor wafer according to the process of the invention.

FIG. 2 shows a section of a semiconductor wafer 1 of silicon which is e.g. a wafer for the production of megabit storages. A bar code Sk, which is realized by means of bar elements Se having identical widths, is inscribed on the polished surface of this semiconductor wafer 1 by means of a laser beam. The bar elements Se are formed by means of softmark melting points SSp with a considerable overlap and, for this reason, have a caterpillar-like and scattered-light intensive texture. An additional advantage of the softmark melting points SSp is that no mechanical and/or chemical subsequent treatments are required for removing defects on the wafer surface after the production of the bar code Sk.

The bar code Sk in the embodiment example shown in FIG. 2 is also based on the code type "Code 39". It consists of the start character 2, the seven data characters Dz1 to Dz7 and the stop character 3. Each of these data characters Dz1 to Dz7 and start character 2 or stop character 3, respectively, comprises, in each instance, 7 bar elements Se having an identical width b. The bar code Sk differs from the "Code 39" in that the wide bars bSt are realized by means of two bar elements Se, while the narrow bars sSt are realized in each instance by means of one bar element Se. The detection of the wide bars bSt is effected by means of measuring the extremely small gaps formed by the distance a and by means of counting the respective bar elements Se.

All other data features of the bar code Sk, such as narrow gaps sL and wide gaps bL, conform to the code type "Code 39".

The start character 2, data character Dz4 and the stop character 3 are shown in an enlarged manner in FIG. 2. It can be seen that the identically constructed start and stop characters 2 and 3, respectively, comprise, from left to right, a narrow bar sSt, a wide gap bL, a narrow bar sSt, a narrow gap sL, a wide bar bSt, a narrow gap sL, a wide bar bSt, a narrow gap sL and a narrow bar sSt, wherein the three narrow bars sSt are formed in each instance by means of a bar element Se and the two wide bars bSt are formed in each instance by means of two bar elements Se which are arranged at a distance a. The data character Dz4, which corresponds to the alphabetic character "D", comprises, from left to right, a narrow bar sSt, a narrow gap sL, a narrow bar sSt, a narrow gap sL, a wide bar bSt, a wide gap bL, a narrow bar sSt, a narrow gap sL and a wide bar bSt, wherein the three narrow bars sSt are also formed in this instance by means of one bar element Se and the two wide bars bSt are formed in each instance by means of two bar elements Se arranged at a distance a relative to one another.

In the bar code sK shown in FIG. 2 the following dimensions were realized:

h = 1 mm
b = 10 μm
a = 10 μm
L = 50 μm
l = 20 μm

The height of the bar elements Se and the height of the entire bar code Sk, respectively, are designated by h. A character density of 108 characters/inch was obtained with the indicated dimensions.

Figure 3:
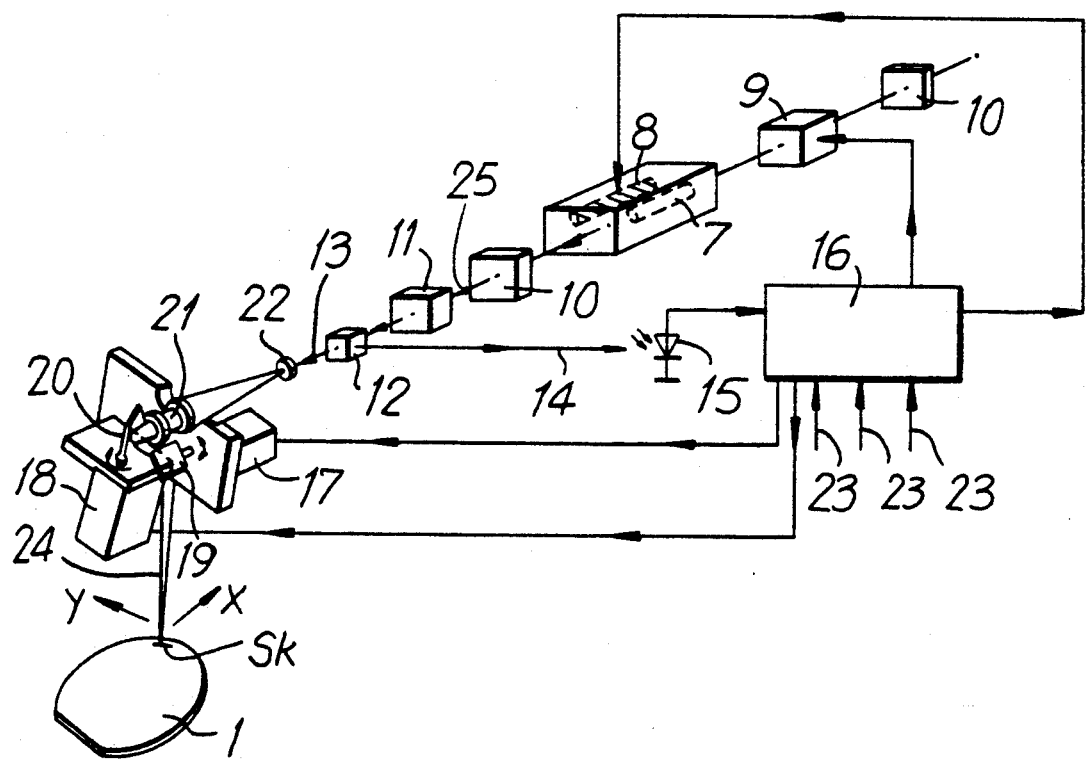
FIG. 3 shows the block wiring diagram of a marking device suitable for applying the bar codes.

FIG. 3 shows the block diagram of a typical marking device, wherein the laser unit used comprises the components nd-yag laser rod 7, pumped light source 8, Q-switch 9, resonator mirror 10, frequency doubler 11 and beam splitter 12. Lens systems 21 and 22, respectively, are provided for focusing and beam expansion. The scanning unit contains the scanning mirrors 19, 20 and the galvanometer drives 17, 18, wherein the ±y scanning device is realized with drive 17 and the ±x scanning device is realized with drive 18. The central control unit comprises the computer system 16 of a reference receiver 15 and the control inputs 23 of the computer system 16.

When applying a bar code to a semiconductor surface, a laser pulse 25 is radiated by means of controlling via a Q-switch 9, which laser pulse 25 strikes the beam splitter 12 after passing the frequency doubler 11 and is split in this splitter into the principle ray 13 and the reference ray 14. The reference ray 14 detected by the photo-receiver 15 serves to regulate the output power by means of the pumped light source 8.

After the expansion of the beam with the lens 22 and subsequent focusing with the lens 21, the ray bundle passes through the scanning mirrors 20, 19 and then strikes the silicon wafer 1 as a tightly bundled laser spot 24. The bar code Sk, shown by way of example in FIG. 2, is applied by means of defined control of the Q-switch 9, the galvanometer drives 17, 18 and the pumped light source 8 by means of computer system 16. In so doing, the laser beam is continuously guided over the respective semiconductor wafer which is stationary during the bombardment. It is also easily possible to move the semiconductor wafer for the purpose of applying the bar code and to leave the laser at rest, or to move the laser as well as the semiconductor wafer so as to be coordinated with one another.

In the marking of semiconductor wafers of monocrystalline silicon described above, a pulse frequency of 9 KHz was adjusted with the Q-switch 9. At an effective laser output of approximately 200 mWatts, the scanning speed was approximately 30 mm/s. In so doing, a melting depth of approximately 1 μm was effected.

The frequency doubler 11 changes the wavelength of the nd-yag laser rod 7 from an original λ=1064 nm to λ=532 nm. A sharper focusing of the laser spot 24 is effected by means of this frequency doubling and a greater penetration depth with a pronounced ramplike texture of the bar elements Se is accordingly effected (compare FIGS. 1 and 2).

A softmark marking which is produced according to the process, according to the invention, and is achieved only by means of a slight melting of the corresponding regions on the surface of the polished semiconductor wafer can comprise e.g. the identification number, the supplier of the semiconductor wafer, the doping, the crystal orientation and the test mark, etc. The depth of the softmark marking is advisably in the order of magnitude of 1 μm.

The process, according to the invention, can be applied in a corresponding sense in all standard code types containing wide and narrow bars. The encoded data of a wide bar is formed in each instance by means of bar elements of identical widths at a quantity greater than 1. Angularly offset bar elements, such as occur in an annular marking at the outer rim of the semiconductor wafer, also have informational quality with respect to the small character height and the high character density. However, bar recesses arranged parallel to one another are normally detected during the decoding.

We claim:

1. In a process for marking semiconductor surfaces with a bar code (Sk) having narrow bars (sSt) and wide bars (bSt) separated one from the other by a narrow gap (sL) or a wide gap (bL), said process comprising producing by laser bombardment with a softmark technique a plurality of parallel bar elements (Se), forming each bar element by a series of overlapping softmark melting points (SSp), applying the melting points (SSp) of the bar elements (Se) at a depth of less than 2 micrometers, and controlling the laser bombardment with respect to time so that, when producing one of the softmark melting points (SSp), the previously produced softmark melting point is at least partially hardened so as to maintain a contour of the previously produced softmark melting point.

2. The process of claim 1, wherein the bar elements (Se) of the wide bars (bSt) are applied at a distance (a) of less than 15 μm relative to one another.

3. The process of claim 1, wherein the bar elements (Se) are applied with a width (b) of less than 15 μm.

4. The process of claim 1, wherein the softmark melting points (SSp) are produced with a pulsed Nd-YAG laser.

5. The process of claim 4, wherein an output-stabilized, frequency doubled Nd-YAG laser is used.

6. The process of claim 1, wherein each of said narrow bars (sSt) is formed by a number n of said bar elements (Se) of equal width (b) and each of said wide bars (bSt) is formed by a number m of said bar elements (Se) of equal width (b), said bar elements (Se) of said wide bars being spaced a distance (a) from each other, wherein m and n are whole numbers and m>n.

7. The process of claim 6, wherein each of said wide bars (bSt) is formed by two parallel ones of said bar elements (Se) and each of said small bars is formed by one of said bar elements (Se).

* * * * *